(12) United States Patent
Szeto et al.

(10) Patent No.: US 8,046,415 B2
(45) Date of Patent: Oct. 25, 2011

(54) THROTTLING OF MASS MAILINGS USING NETWORK DEVICES

(75) Inventors: Bailey G. Szeto, San Jose, CA (US); Shamim Pirzada, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 565 days.

(21) Appl. No.: 11/673,261

(22) Filed: Feb. 9, 2007

(65) Prior Publication Data

US 2008/0195709 A1 Aug. 14, 2008

(51) Int. Cl.
*G06F 15/16* (2006.01)
(52) U.S. Cl. .................................. 709/206; 709/233
(58) Field of Classification Search .............. 709/206, 709/233
See application file for complete search history.

(56) References Cited

U.S. PATENT DOCUMENTS

| | | | | |
|---|---|---|---|---|
| 6,006,270 | A * | 12/1999 | Kobunaya | 709/233 |
| 6,615,242 | B1 | 9/2003 | Riemers | |
| 7,117,358 | B2 | 10/2006 | Bandini et al. | |
| 2003/0149726 | A1* | 8/2003 | Spear | 709/206 |
| 2004/0199592 | A1* | 10/2004 | Gould et al. | 709/206 |
| 2004/0249893 | A1* | 12/2004 | Leeds | 709/206 |
| 2005/0050148 | A1* | 3/2005 | Mohammadioun et al. | 709/206 |
| 2005/0080642 | A1 | 4/2005 | Daniell | |
| 2005/0240617 | A1* | 10/2005 | Lund et al. | 707/102 |
| 2006/0031306 | A1 | 2/2006 | Haverkos | |
| 2006/0136590 | A1* | 6/2006 | Barrett et al. | 709/225 |
| 2006/0195589 | A1 | 8/2006 | Vaitl | |
| 2008/0155036 | A1 | 6/2008 | Pirzada et al. | |

OTHER PUBLICATIONS

Robert Lemos. HP aims to throttle Net threats. Published Feb. 23, 2004. http://news.zdnet.com/2100-1009_22-5163633.html.
Cynthia Wong, et al. A Study of Mass-mailing Worms. http://www.icir.org/vern/worm04/cynthiaw.pdf. Last accessed Apr. 27, 2007.
HP Virus Throttle technology: stealth defense against malicious code in Microsoft Windows environments. 2005. http://h20000.www2.hp.com/bc/docs/support/SupportManual/c00369532/c00369532.pdf.
"AIM Triton (exe), from America Online", [online]. TechRepublic, 1996 [retrieved on Jan. 16, 2007]. Retrieved from the Internet: <URL: http://software.techrepublic.com/download.aspx?docid=241351>, (Jul. 2006), 3 pgs.

* cited by examiner

*Primary Examiner* — Kenny Lin
(74) *Attorney, Agent, or Firm* — Schwegman, Lundberg & Woessner, P.A.

(57) ABSTRACT

A system and method that effectuates dynamic mass mail throttling utilizing an upstream network device. The system and method includes intercepting messages from sending mail server, determining whether the message relates to mass mailing advertising emails, and based the determination automatically and dynamically directing upstream network devices to gradually retard communications between the sending mail server and the upstream network devices.

21 Claims, 8 Drawing Sheets

US 8,046,415 B2

THROTTLING OF MASS MAILINGS USING NETWORK DEVICES

TECHNICAL FIELD

The claimed subject matter relates generally to systems and/or methods that detect mass electronic-mailings from legitimate and illegitimate sources and thereafter communicates with an upstream network device to progressively constrain connections emanating from those sources.

BACKGROUND

There are many and various factors that can cause email servers to experience stress due to information overload. Examples are spam storms (and other mail related attacks), denial of service attacks, legitimate and illegitimate (albeit not illegal) mass marketing mailings, to name a few. Nevertheless, there are many instances where legitimate enterprises in furtherance of their business goals will want and need to disburse advertising and marketing information to interested consumers/customers.

Loyalty programs are marketing contrivances employed in many commercial sectors, such as, for example, retail (e.g. supermarket rewards cards, points cards, club cards, and the like) and commercial aviation (e.g. frequent flyer programs, etc.), that reward band loyalty. Typically, customers/consumers enrolled in the program accrue points and are entitled to discounts and/or rewards based upon pre-established criteria (e.g. distance flown on a particular airline, amount of produce purchased from a particular retail establishment, etc.). In order for loyalty programs and other mass marketing programs to keep their members apprised of various available offers, discounts, rewards and developments associated with these programs, many, if not most, have adopted electronic mail (email) as one of the preferred methods of communication to contact their members.

Typically, enterprises (e.g., commercial, educational, institutional, governmental, etc.) have substantial electronic mail infrastructure that for the most part is specifically constructed to satisfy a particular enterprise's unique requirements. While such electronic mail infrastructure may be perceived as being considerable, the electronic mail infrastructure utilized by organizations involved in mass marketing and/or loyalty marketing campaigns can be many orders of magnitude larger and more powerful than those ever conceived and/or required by typical enterprises. Thus when electronic mail infrastructure utilized by organization involved in mass marketing and/or loyalty marketing campaigns commence disseminating electronic mail related to the marketing campaign the volume of messages (e.g. in the tens of thousands to hundreds of thousands) that can be received by a typical enterprise electronic mail infrastructure can be so overwhelming that the typical enterprise electronic mail infrastructure will generally issue a transient error message. Transient error messages typically inform sending systems to try sending their messages later. This however has two major problems. First, there is no control as to when the sending system might try to resend the message; it might be 10 minutes, 4 hours, 1 day or never. Second, transient error messages cause a yo-yo effect since all global systems are effectively told to re-send their messages at some later time. So once the receiving mail server has recovered sufficiently to start accepting connections again, those systems that were told to re-send at a later time immediately re-send causing the receiving system to vacillate between issuing transient error messages and accepting connections for a period from anywhere between 24 to 48 hours.

DETAILED DESCRIPTION

Overview

Figure 1:
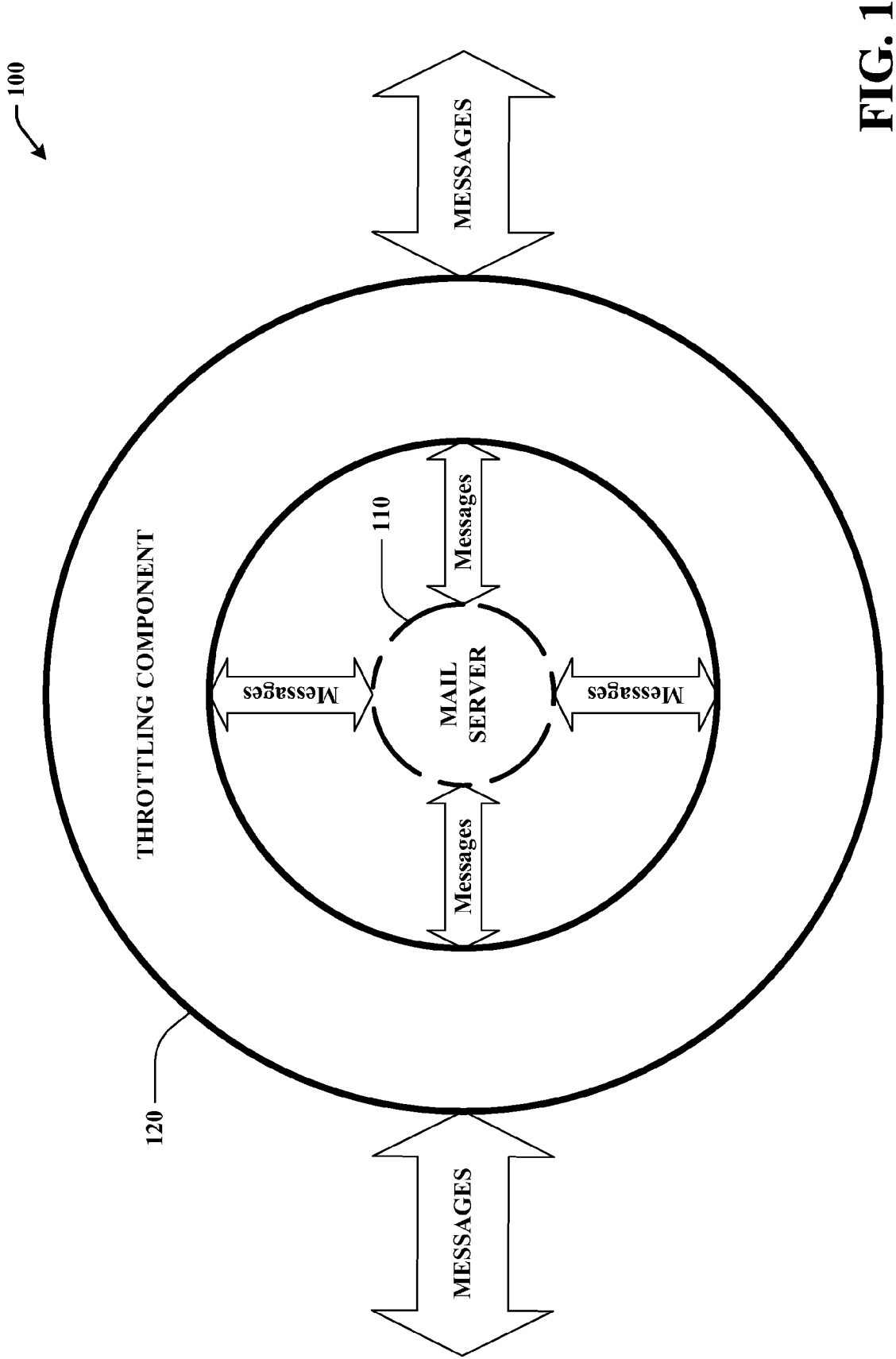
FIG. 1 illustrates a machine-implemented system that effectuates and facilitates mass electronic mail throttling using network devices in accordance with the claimed subject matter.

The following presents a simplified overview in order to provide a basic understanding of some aspects of the disclosed subject matter. This overview is not an extensive overview, and it is not intended to identify key/critical elements or to delineate the scope thereof. Its sole purpose is to present some concepts in a simplified form as a prelude to the more detailed description that is presented later.

The claimed subject matter relates generally to detecting mass mailings and then communicating with an upstream network device to throttle the connections coming from the domain sending the mass mailings. In one aspect the claimed subject matter pertains to a system that effectuates dynamic mass mail throttling, comprising: a throttling component that receives a message from a transmitting mail server, determines whether the message relates to a mass mailing, and based at least on the determination automatically directs an upstream network device to associate a wait state to the transmitting mail server.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF EXAMPLE EMBODIMENTS

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

The claimed subject matter provides improved solutions as to when and how mass mailings are directed towards recipients, ensures that mail servers are never too busy to deliver and receive emails unrelated to mass mailings in an expeditious and timely manner and attempt to obviate the necessity for mail servers to issue transient error messages. The subject matter as claimed in one illustrative aspect can be included on any upstream network device. For example, the claimed subject matter can be included on a mail server that is in communication with an upstream network device (e.g., a firewall, an edge router, etc.). As a further example, the subject matter as claimed can be included in a network device interposed between a mail server and an upstream network device (e.g., in this instance the mail server configuration need not be modified). In yet a further example, the claimed subject matter can comprise the upstream device itself (e.g., the subject matter as claimed can be the firewall).

FIG. 1 illustrates a system 100 that effectuates and facilitates mass electronic mail throttling using network devices. System 100 includes mail server 110 that, as typical of mail servers, can receive and disseminate electronic mail messages. Mail server 110 as depicted further is in communication with throttling component 120 that in one aspect of the claimed subject matter receives and transmits electronic mail messages from disparate mail servers situated on a multitude of disparate network topologies (e.g. Local Area Networks (LANs), Wide Area Networks (WANs), Extranets, Intranets, the Internet, etc.). Throttling component 120, and/or the functionality thereof, can be included on a network device distinct from mail server 110 (e.g., firewall, edge router, etc.). Alternatively and/or additionally, throttling component 120, and/or portions thereof, can be included, implemented, or resident, on mail server 110. As illustrated throttling component 120 can be situated in a manner such that throttling component 120 interposes itself between mail server 110 and disparate transmitting mail servers extant on the multitude of network topologies. Throttling component 120 thus intercepts all incoming messages emanating from disparate transmitting mail servers situated on the multitude of network topologies and further receives all outgoing messages being disseminated by mail server 110 for subsequent distribution to the multitude of disparate transmitting mail servers.

Throttling component 120 on receipt of incoming messages from transmitting mail servers other than mail server 110 investigates packet headers and contents of incoming messages, identifies which physical devices disseminated messages (e.g., via Media Access Control (MAC) address, Internet Protocol (IP) address, Network Interface Controller (NIC) address, and the like), and ascertains other identifying information, such as, for example, domain name, date and time message was sent, who sent the message (e.g., from the originator fields of the message), the message identifier (e.g., from the message ID field), etc. Additionally, throttling component 120 compares the foregoing data with information, if any, that has been previously persisted, and where necessary determines a relative rate at which a particular transmitting mail server is issuing messages and throttling component 120 is receiving these messages. Throttling component 120 based at least in part on the determined relative rate can automatically commence bandwidth limiting by closing down the transmission bandwidth associated with the identified transmitting mailer server. For example, where transmitting mailer server has initially been assigned a bandwidth of 100 Mbits/sec, throttling component 120 can dynamically, progressively and successively reduce the assigned bandwidth (e.g., 10 Mbits/sec, 1 Mbits/sec, . . . , etc.). Where throttling component 120 ascertains that the transmitting mail server is issuing messages at a rate so egregious that it is beyond the capabilities of mail server 110, throttling component 120 can reduce the assigned bandwidth to zero, effectively closing down the transmitting mail server's access to mail server 110.

Figure 2:
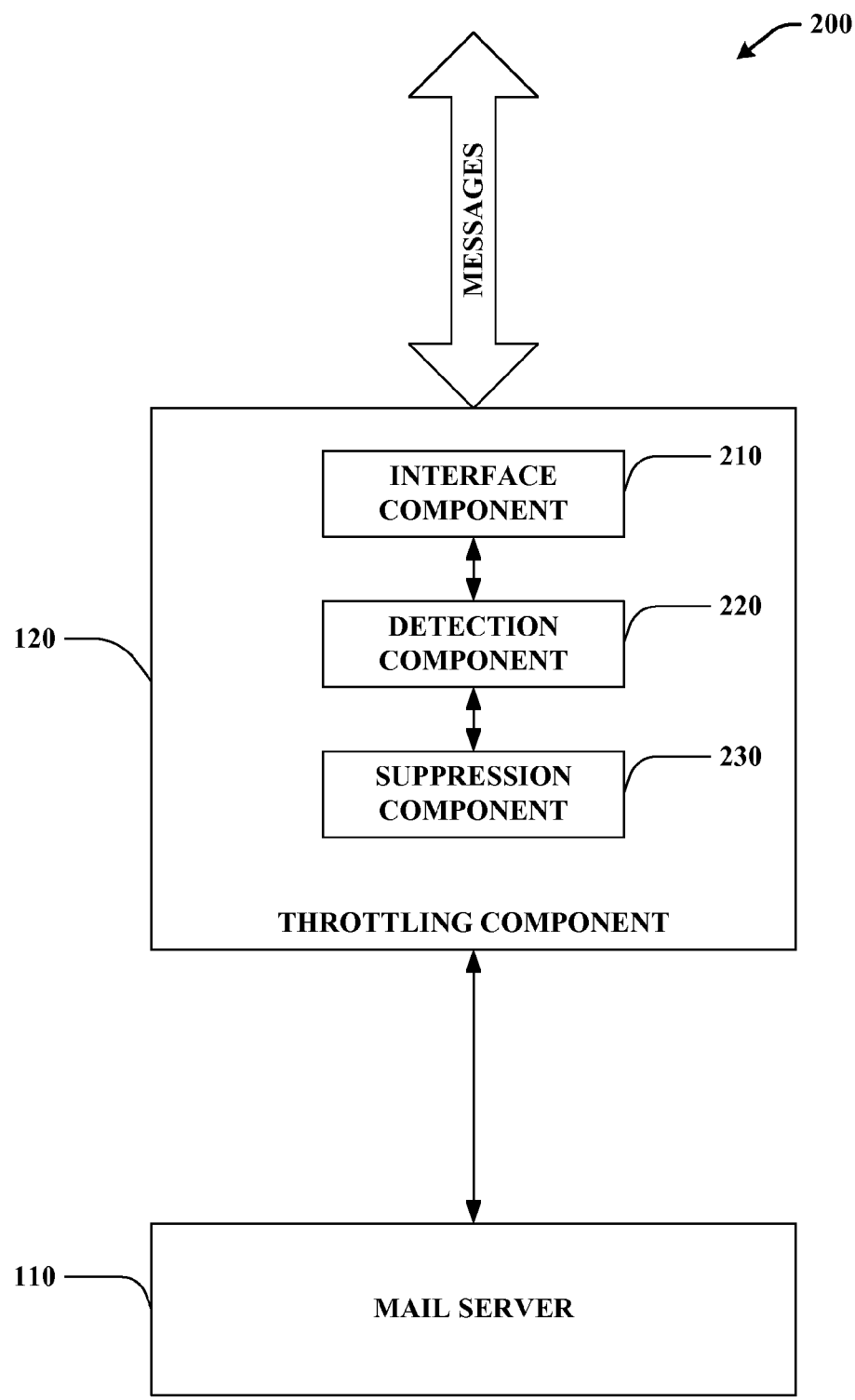
FIG. 2 provides a more detailed depiction of one aspect of a throttling component in accordance with one aspect of the claimed subject matter.

FIG. 2 provides a more detailed depiction 200 of one aspect of throttling component 120. Throttling component 120 can be in operative communication with mailer server 110 and can include interface component 210 that receives and transmits messages from a multitude of diverse transmitting mailer servers dispersed on a network topology, such as, for example, the Internet, a Local Area Network (LAN), a Wide Area Network (WAN), etc. Additionally, interface component 210 can also receive messages from mail server 110 for subsequent transmission to mail servers located on the network topology.

Throttling component 120 can further include a detection component 220 that identifies the transmitting mail server (e.g., utilizing Address Resolution Protocol (ARP)), determines from, for example, message header fields other pertinent information associated with the received message (e.g., domain name, message sender's identity, message ID number, time-stamp data, etc.), and utilizes information regarding the transmitting mail server and other salient information associated with, and derived from, the received message to ascertain whether the transmitting mail server and the information contained in the message header has been previously identified and persisted. Detection component 220 additionally, based at least in part on information associated with the received message and information previously identified and persisted, determines a rate at which a transmitting mail server, and more particularly a particular email address, or group of email addresses, is distributing messages.

Throttling component 120 can also include a suppression component 230 that based at least in part on the information furnished by detection component 220 can effectuate measure to ensure that the identified transmitting mail server perceives a diminution in the speed at which messages are being received by mail server 110. For example, where a transmitting mail server is initially able to deliver messages to mail server at Gigabit speed, when throttling component 120, though its various components, ascertains that the transmitting mail server has commenced transmitting loyalty marketing program bulk or batch emails, suppression component 230 can automatically and progressively commence reducing the bandwidth available for the identified transmitting mail server to deliver its messages. Thus, where detection component 220 ascertains that the rate at which a transmitting mail server is delivering messages from a particular mail account exceeds a particular set point or dynamically ascertained threshold, suppression component 230 can, for example, progressively reduce the bandwidth available for the identified mail server from 1 Gbits/sec to 100 Mbits/sec at the first instance of the rate exceeding the threshold, from 100 Mbits/sec to 10 Mbits/sec on the second occurrence of the rate exceeding the threshold, and so on, until such time that the rate at which the messages are being received reaches a steady state. Conversely, where a transmitting mail server has progressively been assigned successively narrower bandwidths to effectively calm or smooth out the superabundance of messages emanating from the transmitting mail server, suppression component 230 can gradually restore bandwidth associated with a transmitting mail server when detection component 220 indicates that the rate at which messages are being received has significantly diminished.

While FIG. 2 is a block diagram illustrating components for the system 200, it is to be appreciated that the system 200, the interface component 210, the detection component 220, and/or the suppression component 230 can be implemented as one or more computer components, as that term is defined herein. Thus, it is to be appreciated that computer executable components operable to implement the system 200, the interface component 210, the detection component 220, and/or the suppression component 230 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 3:
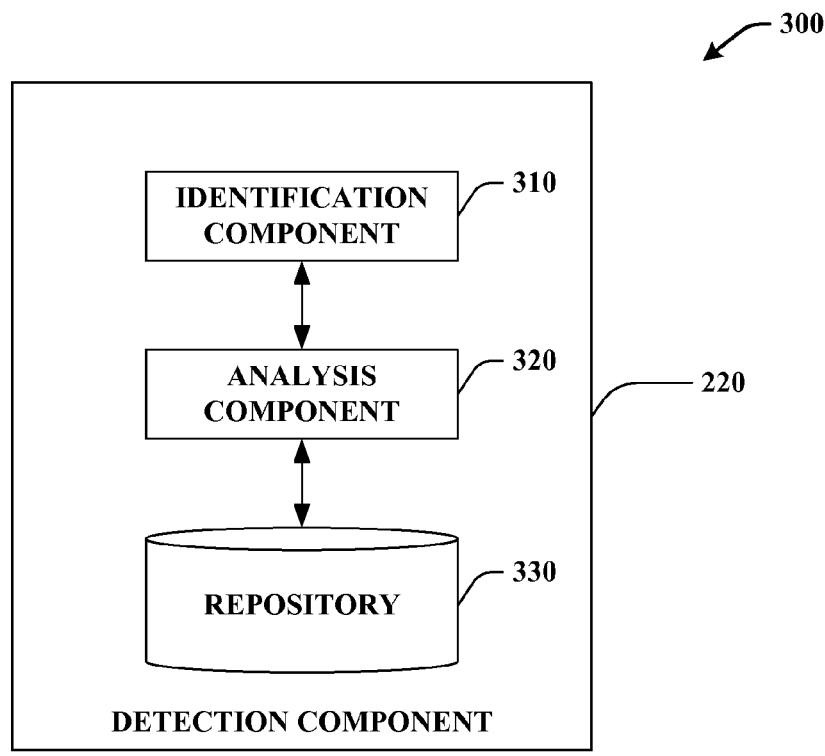
FIG. 3 provides a more detailed depiction of a detection component in accordance with an aspect of the subject matter as claimed.

FIG. 3 provides a more detailed depiction 300 of detection component 220 in accordance with an aspect of the subject matter as claimed. As illustrated detection component 220 includes identification component 310 that examines the packet and message headers of all packets and messages that are received by throttling component 120. Identification component 310 can employ packet header and/or trailer information to identify a particular, or group of, transmitting servers that can be distributing mass marketing email messages. Additionally, identification component 310 can also ascertain various other information regarding transmitting servers, such as, for example, hardware addresses and type(s) of processor(s), network interface component type(s) and associated address(es), and path(s) traversed by a message and network components through which the message traversed. Moreover, identification component 310 can also utilize information in the packet payload (e.g., the message itself) to ascertain, for example, the origination date (e.g., the date and time at which the creator of the message indicated that the message was complete and ready to enter the mail delivery system), the identity of the party that sent the email message (e.g., from the originator fields), and a message identifier (e.g., from the identification fields) that uniquely identifies and refers to a particular version (or instantiation) of a particular message. Identification component 310 can, having deduced and identified from whence the message emanated can persist this information to repository 330. Additionally identification component 310 can initialize and increment appropriate counters where necessary to indicate receipt of messages.

Detection component 220 can also include analysis component 320 that, in conjunction with repository 330 and information supplied by identification component 310, can determine whether there has been a relative increase, or diminution, in the rate at which messages originating from a particular transmitting mail server, or group of mail servers, is being received. Analysis component 320 can ascertain the increase or decrease in the rate at which messages are arriving from a particular transmitting mail server based at least on a pre-established set point (e.g., the set point can be specified by a system administrator). Alternatively and/or additionally, analysis component 320 can utilize a dynamically fluctuating threshold, wherein the threshold is set based on factors such as, for example, contemporaneous network throughput to mail server 110, performance indications received from mail server 110, external parameters supplied by a system and/or network administrator, the relative rate at which disparate other messages associated with disparate other mail servers are being received, etc.

Figure 4:
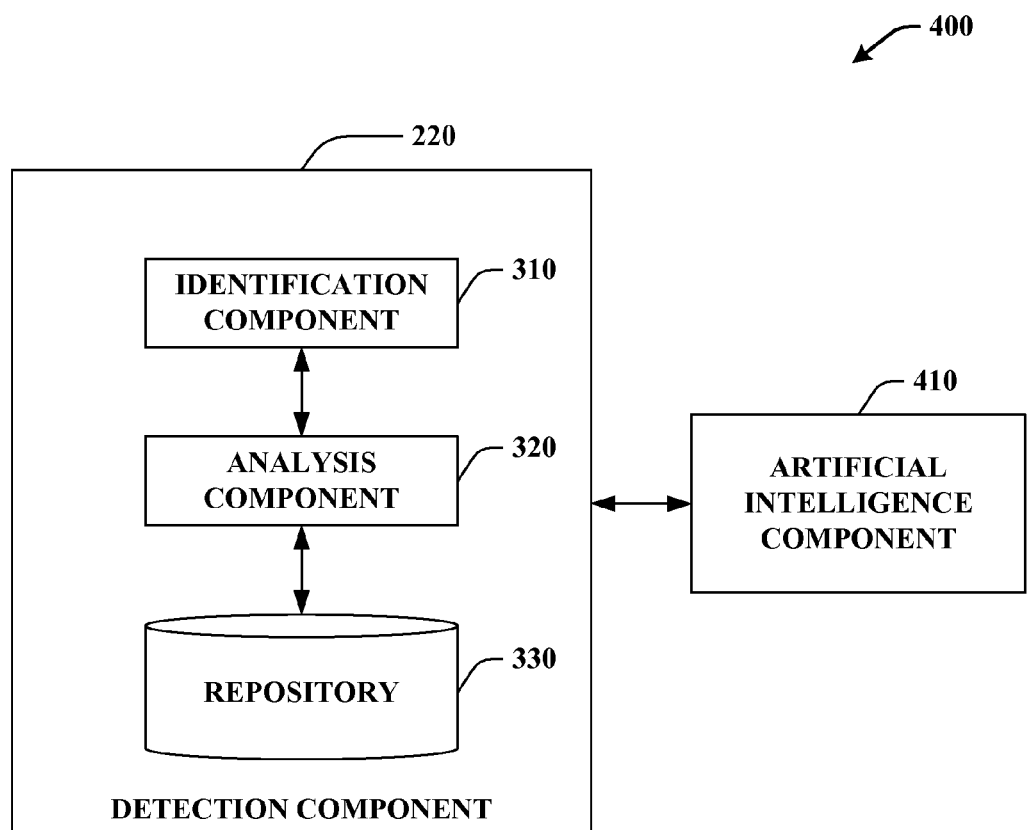
FIG. 4 depicts a further aspect of detection component in accordance with the claimed subject matter

FIG. 4 depicts a further aspect 400 of detection component 220. As illustrated detection component 220 can be in communication with artificial intelligence component 410 that employs intelligence to facilitate determining a dynamically adjustable threshold. The detection component 220 can include identification component 310, analysis component 320 and repository 330 which can be substantially similar to respective components, services, network services, interfaces, and interface components described in previous figures. Artificial intelligence component 410 can be utilized by analysis component 320 to facilitate accurately determining a dynamically adjustable threshold. For example, artificial intelligence component 410 can infer, based on data persisted in repository 330 and in conjunction with analysis component 320, a dynamically fluctuating threshold, wherein the threshold is set based on factors such as, for example, contemporaneous network throughput to mail server 110, performance indications received from mail server 110, the relative rate at which disparate other messages associated with disparate other mail servers are being received, etc.

It is to be understood that artificial intelligent component 410 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
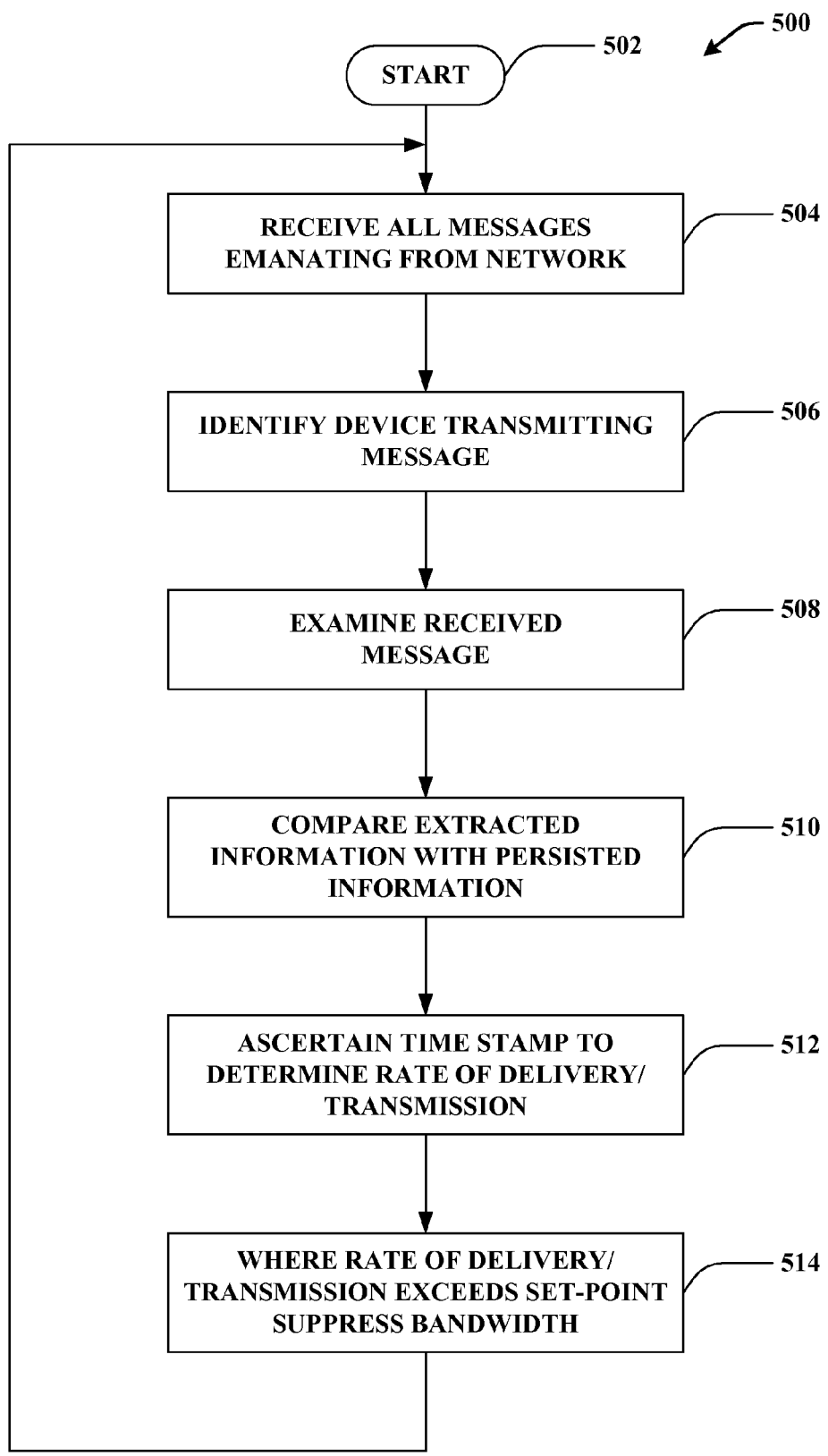
FIG. 5 illustrates a flow diagram of a methodology that facilitates and effectuates dynamic throttling of mass mailings utilizing network devices.
Figure 6:
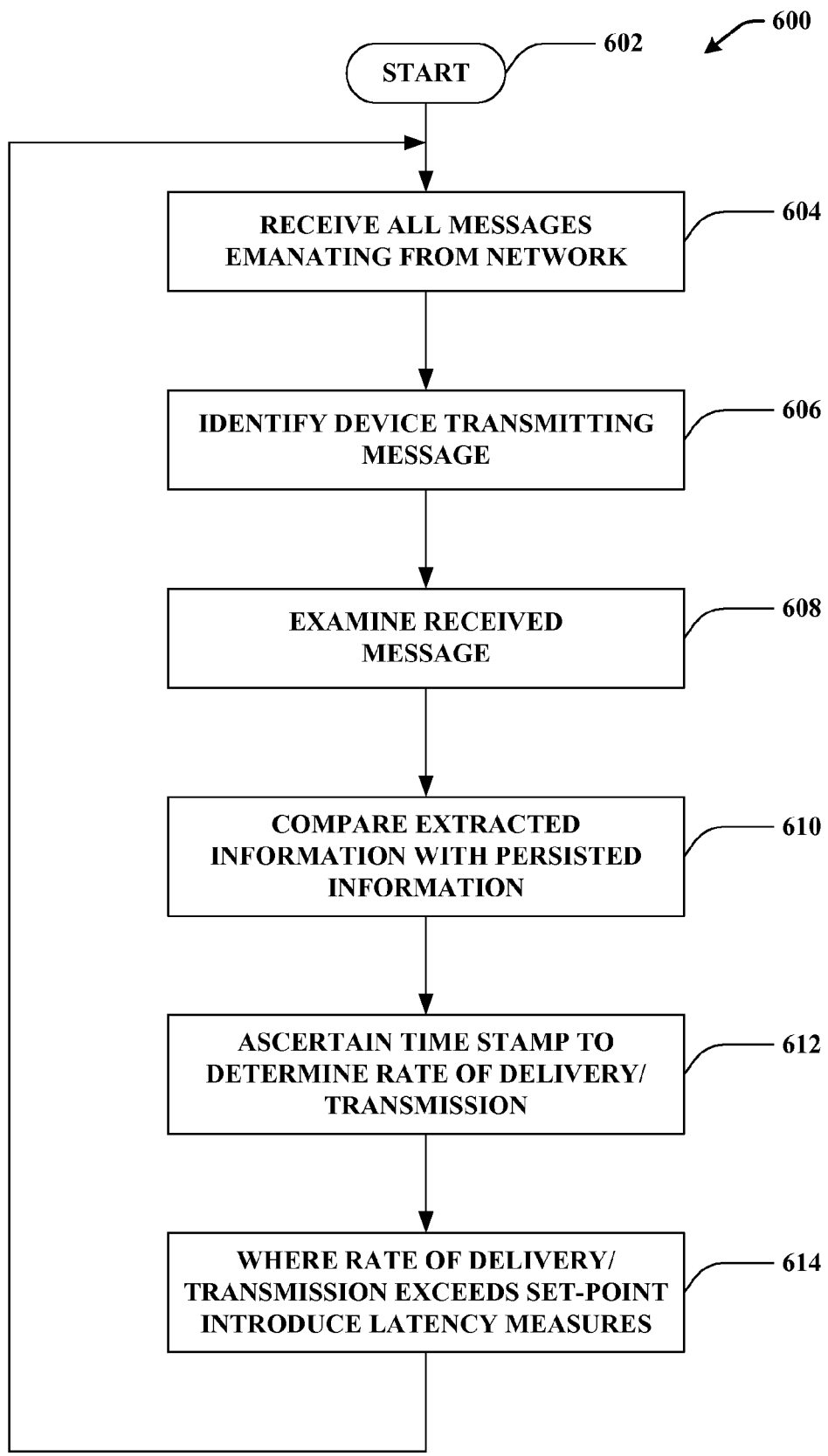
FIG. 6 provides a flow diagram of a methodology that facilitates and effectuates dynamic throttling of mass mailings utilizing network devices in accordance with a further aspect of the claimed subject matter.

In view of the exemplary systems shown and described supra, methodologies that may be implemented in accordance with the disclosed subject matter will be better appreciated with reference to the flow charts of FIGS. 5-6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 5 illustrates a flow diagram of a methodology 500 that facilitates and effectuates dynamic throttling of mass mailings utilizing network devices. Method 500 commences at 502 wherein various processor initializations tasks and background activities are performed as power is applied to the system. After these tasks have been performed the method proceeds to 504 at which point all messages emanating from all transmitting mail servers and directed to mail server 110 are intercepted by the system. At 506 the methodology identifies the device transmitting a particular message. Such identification can be obtained by investigating packet headers and/or trailers associated with the message. At 508 the methodology examines the packet payload (e.g., the message itself) to obtain various originator information (e.g., the identity of the originator of the message, the time when the message was sent, etc.) whereupon the method proceeds to 510. At 510 information extracted from packet headers, trailers and payload is scrutinized and compared with previously persisted information related to the currently extracted information. At 512 the method, in order to determine a rate of delivery can ascertain from time stamp information appended to the message and from time stamps associated with, and appended to, previously received and investigated messages the rate of delivery and/or transmission associated with a particular message. At 514 where it is ascertained that the rate of delivery associated with a particular message exceeds a threshold or set point measures can be taken to progressively suppress the bandwidth associated with the transmitting mail server associated with the identified message, after which the method cycles back to 504.

FIG. 6 provides a flow diagram of a methodology 600 that facilitates and effectuates dynamic throttling of mass mailings utilizing network devices in accordance with a further aspect of the claimed subject matter. At 602 various and sundry processor initializations tasks and background activities are performed. Upon completion of these tasks the method proceeds to 604 wherein all messages emanating from all transmitting mail servers situated on one or more network topologies and directed to mail server 110 are intercepted. At 606 the method identifies the device or devices transmitting particular messages. Such identification can be obtained by investigating packet headers and/or trailers associated with the message. At 608 the method examines the packet payload to retrieve originator information (e.g., the identity of the originator of the message, the time when the message was sent, etc.). At 610 information extracted from packet headers, trailers and payload is scrutinized and compared with previously persisted information related to the currently extracted information. At 612 the method, in order to determine a rate of delivery can ascertain from time stamp information appended to the message and from time stamps associated with, and appended to, previously received and investigated messages the rate of delivery and/or transmission associated with a particular message. At 614 where it is ascertained that the rate of delivery associated with a particular message exceeds a threshold or set point measures can be taken to progressively introduce progressively longer wait states to be assigned the transmitting mail server associated with the identified message, after which the method cycles back to 604.

Figure 7:
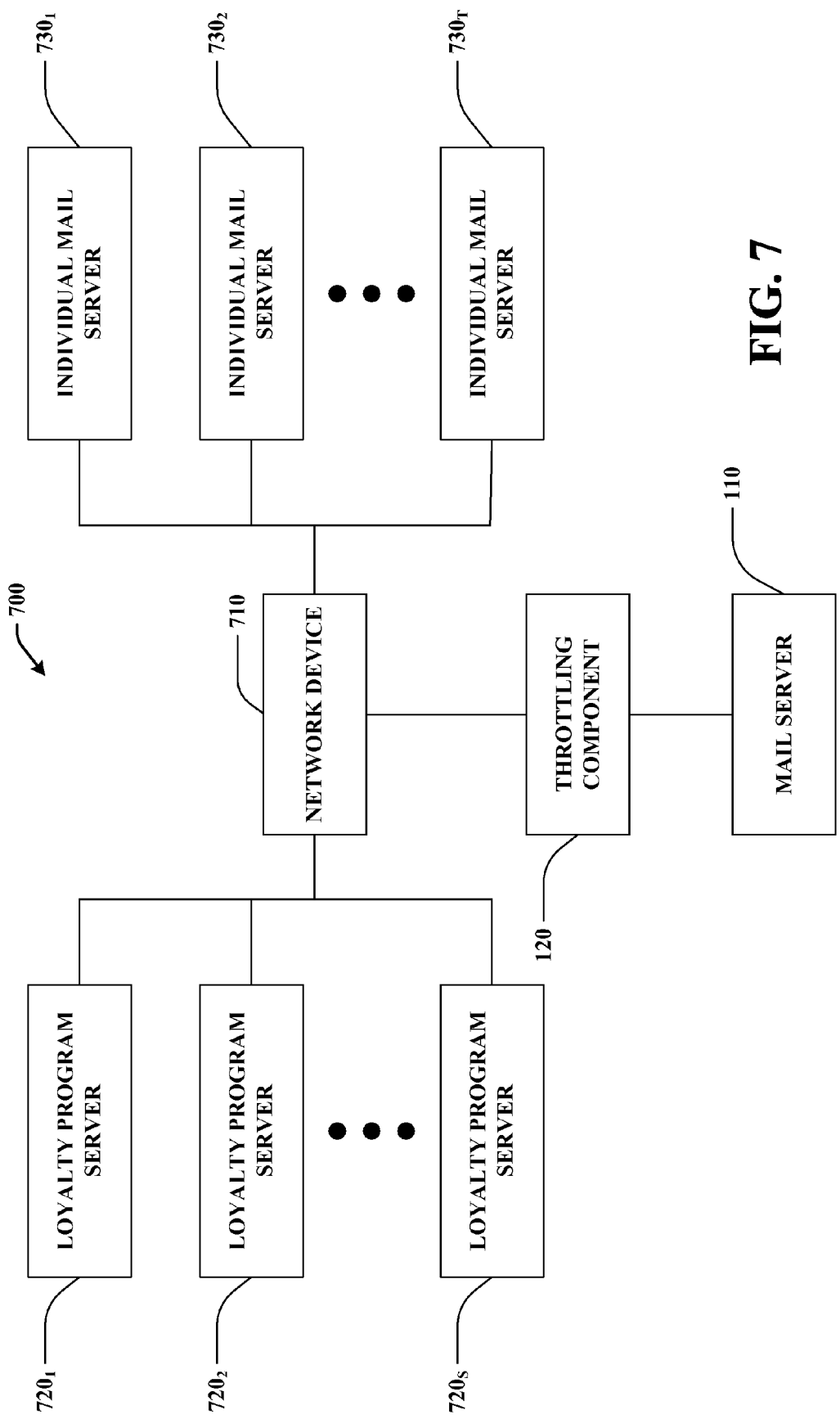
FIG. 7 illustrates a system that facilitates and effectuates automatic and dynamic throttling of mass mailings utilizing network devices in accordance with an aspect of the claimed subject matter.

FIG. 7 illustrates a system 700 that facilitates and effectuates automatic and dynamic throttling of mass mailings utilizing network devices in accordance with an aspect of the claimed subject matter. System 700 includes mail server 110 and throttling component 120 the functionality and operation both of which have been elucidated supra. Additionally, system 700 also includes network device 710 (e.g. edge router, firewall, router, network bridge, network switch, hub, etc.) that can be in communication with throttling component 120. Network device 710 can be located upstream of mail server 110 and throttling component 120 and can be located such that network device 710 intercepts all communications destined for mail server 110 via throttling component 120. In addition, network device 710 can receive direction from throttling component 120 to effectively reduce bandwidth to specific transmitting mail servers. Alternatively and/or additionally, network device 710 can introduce successively longer wait states (or latency) into transmissions directed to and from a transmitting mail server (e.g., utilizing the Simple Mail Transfer Protocol (SMTP)) so as to give the impression to the transmitting mail server that communications between transmitting mail server and receiving mail server 110 has become progressively and excessively slower, with the ancillary result that the transmitting mail server starts to curb the rate at which it disseminates messages to mail server 110, and in particular, messages related to mass mailings.

Further as depicted in FIG. 7, network device 710 can be in operative communication with a first loyalty program server $720_1$, through a Sth loyalty program server $720_S$, S being an integer greater than or equal to one. The first loyalty program server $720_1$ through a Sth loyalty program server $720_S$ can be collectively referred to as loyalty program servers 720. Loyalty program servers 720 can be associated with disparate loyalty programs (e.g., one loyalty program server can be associated with an airline loyalty program, another loyalty program server can be associated with a retail shopping chain loyalty marketing program, etc.). Additionally, while loyalty program servers are illustrated as residing on a single network segment, it is to be appreciated that each individual loyalty program server can be situated on one or more distinct and disparate network segments.

Further, network device 710 can also be in operative communication with a first individual mail server $730_1$, through a Tth loyalty program server $730_T$, T being an integer greater than or equal to one. The first individual mail server $730_1$ through a Tth loyalty program server $730_T$ can be collectively referred to as individual mail servers 730. Individual mail servers 730 while typically substantial and suited to the email requirements of many conventional enterprises (e.g., commercial, educational, institutional, governmental, etc.) will nevertheless be several orders of magnitude less powerful than loyalty program servers 720; loyalty program servers 720 sole and defining task being to disseminate as many messages as possible in the shortest time possible.

Thus, when loyalty program servers 720 are in full operation many hundreds of thousands, if not millions, of email messages can rapidly be transmitted with the effect that without throttling component 120 directing network device 710 to regulate the flow of incoming messages, mail server 110 can become too overwhelmed to be able to process incoming and outgoing messages resulting in mail server 110 sending out transient error messages stating in effect that mail server 110 is too busy to receive incoming messages and requesting that the remote mail server retransmit the message at a later time. This transient error message is sent to all remote mail servers irrespective as to whether or not a particular remote mail server is the cause of the transient error message. Consequently, individual mail servers 730 that typically are incapable on their own of instigating a transient error message to be raised are unduly penalized in that individual mail servers 730 are unable to get their messages to mail server 110 during the period in which mail server 110 is sending out transient error messages. Thus, by employing throttling component 120 in concert with network device 710 messages from individual mail servers 730 will be allowed to get to mail server 110 without let or hindrance (e.g., without any diminution of speed) while bulk or batch messages emanating from loyalty program servers 720 will eventually get through to mail server 110 and their ultimate destination but at a rate that obviates the necessity of mail server 110 to have to raise a transient error message.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g. methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
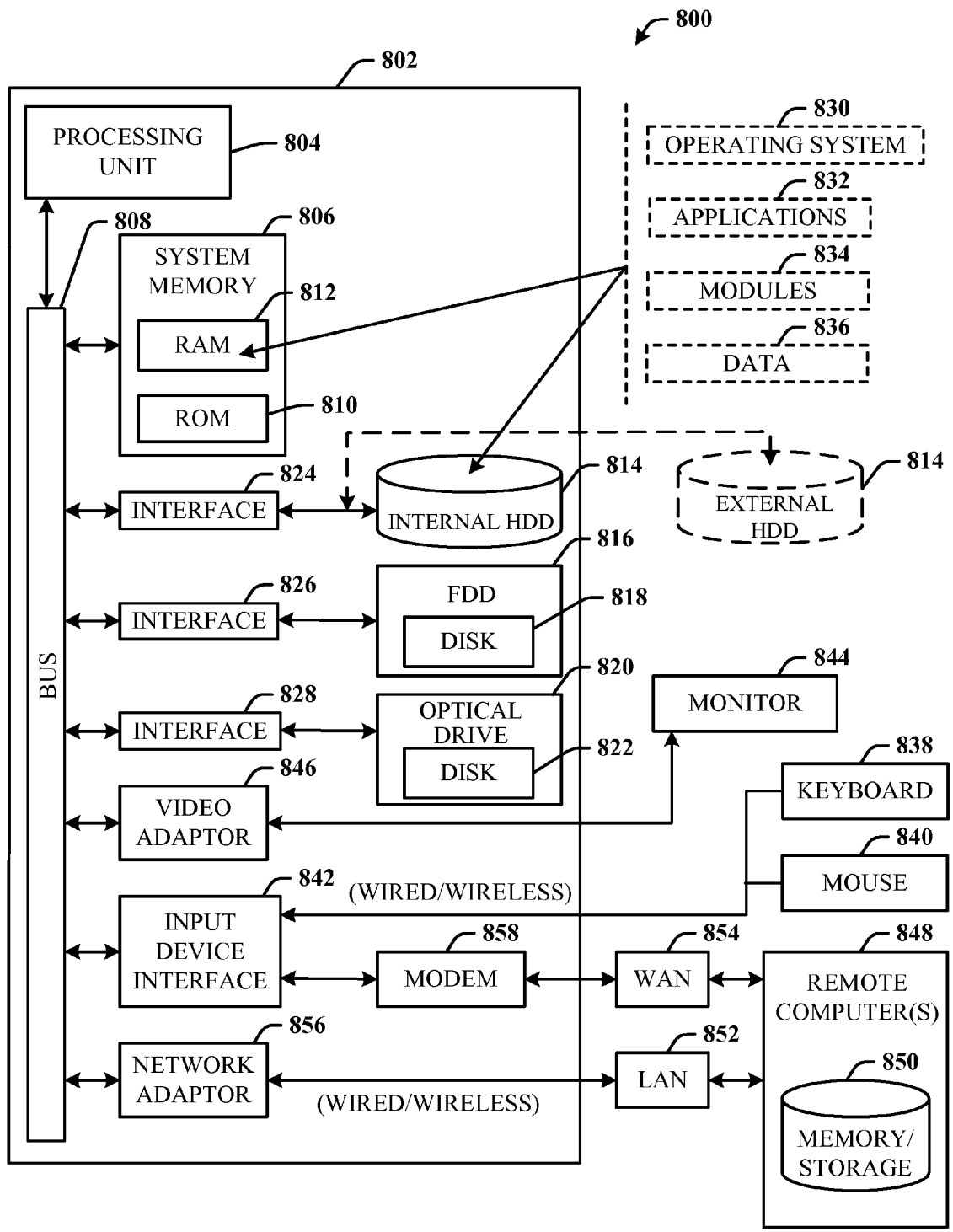
FIG. 8 illustrates a block diagram of a computer operable to execute the disclosed system.

Referring now to FIG. 8, there is illustrated a block diagram of a computer operable to execute the disclosed system. In order to provide additional context for various aspects thereof, FIG. 8 and the following discussion are intended to provide a brief, general description of a suitable computing environment 800 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g. EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the claimed subject matter can be implemented with various commercially available operating systems or combinations of operating systems.

A user can enter commands and information into the computer 802 through one or more wired/wireless input devices, e.g. a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 9:
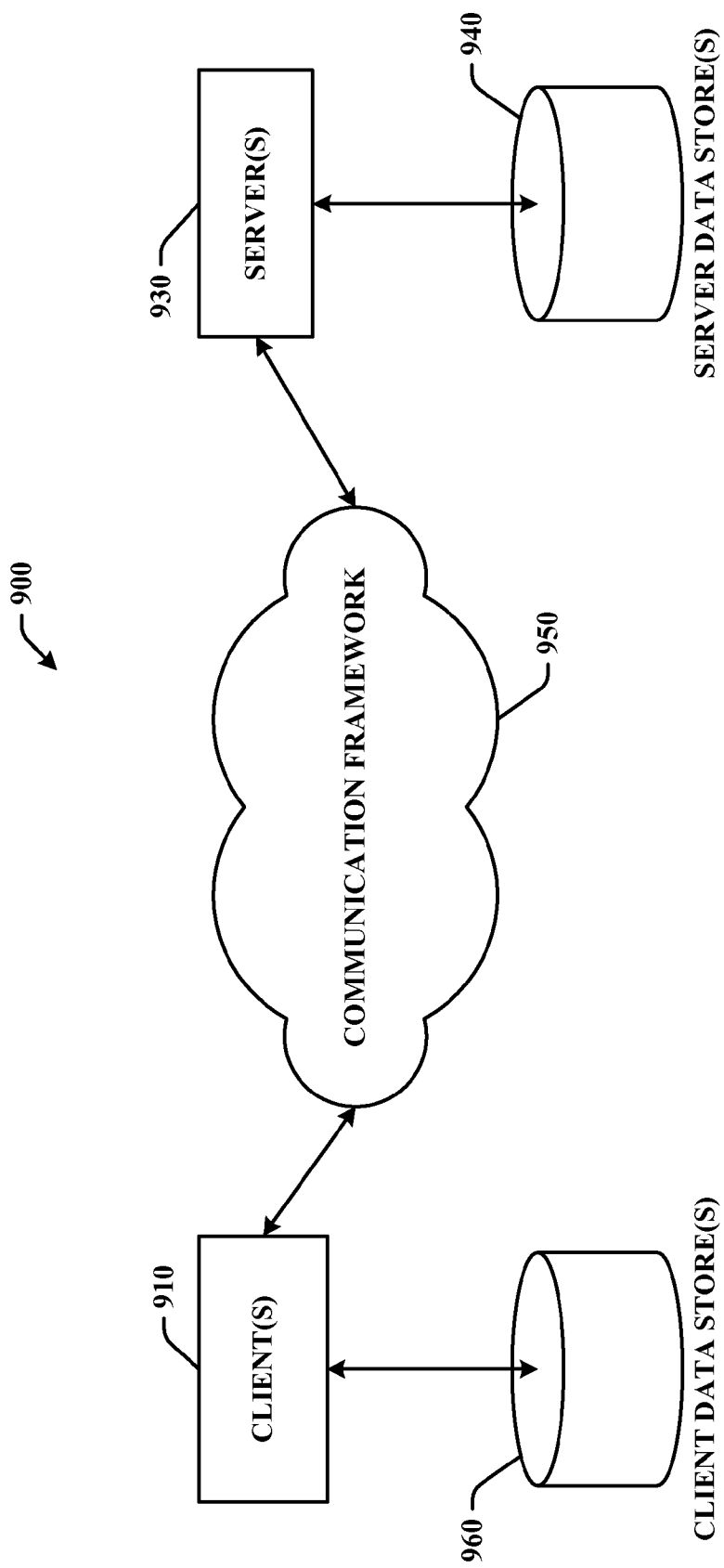
FIG. 9 illustrates a schematic block diagram of an exemplary computing environment in accordance with another aspect of the claimed subject matter.

Referring now to FIG. 9, there is illustrated a schematic block diagram of an exemplary computing environment 900 in accordance with another aspect. The system 900 includes one or more client(s) 902. The client(s) 902 can be hardware and/or software (e.g., threads, processes, computing devices). The client(s) 902 can house cookie(s) and/or associated contextual information by employing the claimed subject matter, for example.

The system 900 also includes one or more server(s) 904. The server(s) 904 can also be hardware and/or software (e.g. threads, processes, computing devices). The servers 904 can house threads to perform transformations by employing the claimed subject matter, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine readable storage medium in communication with at least one processor, the machine-readable storage medium storing instructions, which when executed by the at least one processor, provides operations that effectuates dynamic mass mail throttling, the operations comprising:
    receiving a message from a transmitting mail server;
    extracting information from the message for comparison with previously persisted information;
    determining whether the message relates to a mass mailing by determining a relative rate of delivery based at least in part on the extracted information and the previously persisted information; and
    based at least on the determination that the message relates to a mass mailing, automatically directing an upstream network device to assign a wait state to the transmitting mail server.

2. The machine readable storage medium of claim 1, wherein the operations further comprise identifying the transmitting server based at least in part on information related to a processor associated with the transmitting server.

3. The machine readable storage medium of claim 1, wherein the extracting information further comprises investigating the message and extracting an originator field from the message.

4. The machine readable storage medium of claim 3, wherein the originator field relates to one of a sender identity, a domain name, or a time.

5. The machine readable storage medium of claim 1, wherein the operations further comprise incrementing a counter based on the determining that the message relates to a mass mailing, the counter associated with an attribute associated with the mass mailing.

6. The machine readable storage medium of claim 1, wherein the relative rate is determined by ascertaining time stamp information appended to the message and time stamp information associated with the previously persisted information.

7. The machine readable storage medium of claim 1, wherein the operations further comprise, based at least on the relative rate, indicating to the upstream network device that a bandwidth associated with the transmitting mail server should be reduced.

8. The machine readable storage medium of claim 1, wherein the operations further comprise indicating to the upstream network device that a bandwidth associated with the transmitting mail server should be reduced based at least in part of the relative rate exceeding a user defined threshold.

9. The machine readable storage medium of claim 1, wherein the operations further comprise indicating to the upstream network device that a bandwidth associated with the transmitting mail server should be increased based at least in part on the relative rate falling below a user defined threshold.

10. The machine readable storage medium of claim 1, wherein the operations further comprise employing an intelligence component to ascertain a dynamically adjustable threshold based on the previously persisted information, the adjustable threshold being compared to the relative rate to determine the wait state to be assigned.

11. The machine readable storage medium of claim 1, wherein the wait state is a successively incremented wait state.

12. The machine readable storage medium of claim 1, wherein the determining whether the message relates to a mass mailing comprises determining whether the relative rate, based at least in part on the extracted information and the previously persisted information, exceeds a defined threshold.

13. A machine implemented method that effectuates dynamic mass mail throttling utilizing a network device, the method comprising:
    receiving a message from a remote mail server;
    extracting information from the message for comparison with previously persisted information;
    determining the message relates to a mass mailing based on a relative rate of delivery, the relative rate of delivery being determined based at least in part on the extracted information and the previously persisted information;
    identifying, from the extracted information, an attribute associated with the message and the remote mail server; and
    utilizing the attribute to direct an upstream network device to assign a latency period to the remote mail server.

14. The method of claim 13, wherein the attribute associated with the message is obtained from a packet payload associated with the message.

15. The method of claim 13, wherein the attribute associated with the remote mail server relates to one or more of a Media Access Control (MAC) address, a IP address, or a domain name.

16. The method of claim 13, wherein the relative rate is determined by ascertaining time stamp information appended to the message and time stamp information associated with the previously persisted information.

17. The method of claim 13, further comprising, based on the relative rate, transmitting an indication to the upstream network device that a bandwidth associated with the remote mail server should be decreased.

18. The method of claim 13, further comprising, based on the relative rate and a predetermined threshold, indicating to the upstream network device that the latency period should be increased.

19. The method of claim 13, wherein the upstream network device includes at least one of a firewall, a edge router, a network switch, a network router, or a network hub.

20. The method of claim 18, wherein the predetermined threshold is ascertained by employing an artificial intelligence component.

21. A system that effectuates mass mail throttling, comprising:
one or more processors;
means for intercepting a message from a remote mail server;
means for extracting, using the one or more processors, information from the message for comparison with previously persisted information;
means for identifying the remote mail server; and
means for directing an upstream network device to assign latency period to the remote mail server based on a relative rate of delivery indicating that the message relates to a mass mailing, the relative rate of delivery being determined based at least in part on the extracted information and the previously persisted information.

* * * * *

UNITED STATES PATENT AND TRADEMARK OFFICE
CERTIFICATE OF CORRECTION

PATENT NO. : 8,046,415 B2  Page 1 of 1
APPLICATION NO. : 11/673261
DATED : October 25, 2011
INVENTOR(S) : Bailey G. Szeto et al.

It is certified that error appears in the above-identified patent and that said Letters Patent is hereby corrected as shown below:

In column 18, line 7, in Claim 21, delete "assign" and insert -- assign a --, therefor.

Signed and Sealed this
Thirty-first Day of January, 2012

David J. Kappos
*Director of the United States Patent and Trademark Office*